(12) United States Patent
Geum

(10) Patent No.: US 7,267,360 B2
(45) Date of Patent: Sep. 11, 2007

(54) AIR-BAG DOOR STRUCTURE

(75) Inventor: Woo Youn Geum, Anyang (KR)

(73) Assignee: Hyundai Motor Company, Seoul (KR)

( * ) Notice: Subject to any disclaimer, the term of this patent is extended or adjusted under 35 U.S.C. 154(b) by 415 days.

(21) Appl. No.: 10/885,173

(22) Filed: Jul. 6, 2004

(65) Prior Publication Data
US 2005/0110252 A1 May 26, 2005

(30) Foreign Application Priority Data
Nov. 20, 2003 (KR) .................... 10-2003-0082547

(51) Int. Cl.
*B60R 21/16* (2006.01)
(52) U.S. Cl. .............. 280/728.2; 280/728.3; 280/732
(58) Field of Classification Search ............ 280/728.2, 280/728.3, 732, 733
See application file for complete search history.

(56) References Cited

U.S. PATENT DOCUMENTS

| | | | | |
|---|---|---|---|---|
| 5,275,432 A | * | 1/1994 | Pray et al. ............... | 280/728.2 |
| 5,282,647 A | * | 2/1994 | Barnes ..................... | 280/732 |
| 5,303,951 A | * | 4/1994 | Goestenkors et al. .... | 280/728.3 |
| 5,320,381 A | * | 6/1994 | Barnes et al. ............ | 280/728.3 |
| 6,250,669 B1 | * | 6/2001 | Ohmiya ..................... | 280/732 |
| 6,378,894 B1 | * | 4/2002 | Trevino et al. ........... | 280/728.3 |
| 6,623,029 B2 | * | 9/2003 | Sun et al. ................. | 280/728.2 |
| 6,846,006 B2 | * | 1/2005 | Okuda et al. ............ | 280/728.3 |
| 7,100,941 B2 | * | 9/2006 | Riha et al. ............... | 280/728.3 |
| 7,104,566 B2 | * | 9/2006 | Pinsenschaum et al. . | 280/728.3 |
| 7,118,123 B2 | * | 10/2006 | Weissert et al. ......... | 280/728.3 |
| 2004/0164524 A1 | * | 8/2004 | Ono et al. ............... | 280/728.3 |

FOREIGN PATENT DOCUMENTS

| | | |
|---|---|---|
| JP | 10-217891 | 8/1998 |
| JP | 2002-012116 | 1/2002 |

* cited by examiner

*Primary Examiner*—Paul N. Dickson
*Assistant Examiner*—Toan C. To
(74) *Attorney, Agent, or Firm*—Morgan Lewis & Bockius LLP

(57) ABSTRACT

An air-bag structure includes a tear seam that forms an air-bag door. The tear seam is not broken by shock applied from a passenger room, but the tear seam is easily broken upon expansion of the air-bag to secure smooth and reliable deployment of the air-bag operation and provides a sturdy air-bag structure against the shock from a passenger room.

2 Claims, 3 Drawing Sheets

US 7,267,360 B2

AIR-BAG DOOR STRUCTURE

CROSS REFERENCE TO RELATED APPLICATIONS

This application claims priority of Korean Application No. 10-2003-0082547, filed Nov. 20, 2003, the disclosure of which is incorporated herein by reference.

TECHNICAL FIELD OF THE INVENTION

The present invention relates to a structure of a door for covering an air-bag in a vehicle. More specifically, the air-bag door structure prevents the air-bag door formation area on an instrument panel from being damaged by a shock delivered to the door from a passenger compartment.

BACKGROUND OF THE INVENTION

Typically, an air-bag installed in a front passenger seat compartment is allowed to expand toward an air-bag door that is usually furnished in the instrument panel. Upon further deployment of the air-bag, the air-bag applies pressure to the inner side of the door and opens the door, thereby deploying into the passenger compartment. The typical air-bag door is constructed such that it is not recognized from the outside of the instrument panel such that the passenger room interior of the vehicle may be aesthetically pleasing.

A general method to make the air-bag door not recognizable on the instrument panel is to make the part forming a tear seam inside of the instrument panel with a laser processor. However, a drawback of these tear seams is that they are often broken by force applied from the passenger compartment.

SUMMARY OF THE INVENTION

According to a preferred embodiment of the present invention, an air-bag door has sufficient strength to resist shock applied from a passenger room, but, the tear seam of the door is configured to break easily upon expansion of the air-bag to secure smooth and reliable air-bag operation. If the tear seam that forms an air-bag door is broken by an external shock, not by deployment force of the air-bag, its broken edges may injure a passenger. Thus, the air-bag door tear seam should be able to withstand an external shock while not hindering deployment of the air-bag.

Preferably, the present invention is configured to include a door part that includes a surrounding tear seam formed inside an instrument panel and a chute secured at the instrument panel so that it may be in contact with an instrument panel at a portion where the tear seam is formed. Furthermore, a reinforcement member is combined with an inner side of the door part wherein its circumference portion is combined with the chute in a step form.

In an alternative embodiment, a door support structure for an air-bag includes a peripheral support member configured around an airbag containing space in an instrument panel. An inwardly projecting door support edge is formed on the support member with a stepped shape around its inner periphery. A door support panel with an oppositely stepped peripheral edge is received in the stepped edge of the peripheral support member. The stepped edges are configured and dimensioned to resist force applied to the door support panel from the outside, inward toward the airbag containing space and to permit movement of the door support panel outward, away from the airbag containing space. A door cover overlies the door support panel and is preferably formed visually integrally with the dash panel. A tear seam is positioned in the door cover surrounding the door support edge.

BRIEF DESCRIPTION OF THE DRAWINGS

For better understanding of the nature and objects of the invention, reference should be made to the following detailed description, taken in conjunction with the accompanying drawings, in which.

DETAILED DESCRIPTION OF PREFERRED EMBODIMENTS

Figure 1:
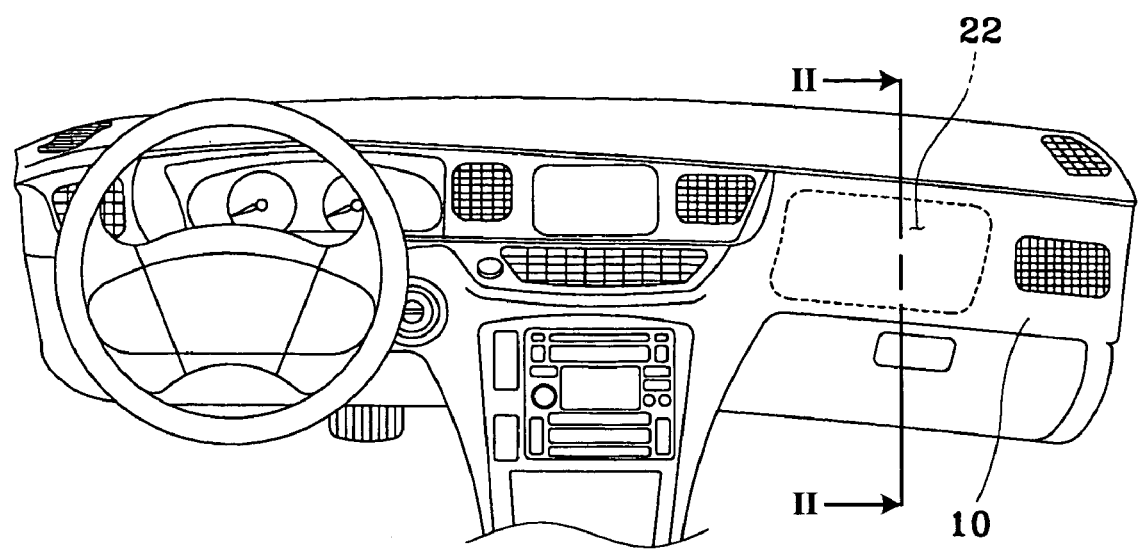
FIG. 1 illustrates a location where an air-bag is mounted on an instrument panel of a front passenger seat according to an embodiment of the present invention.
Figure 2:
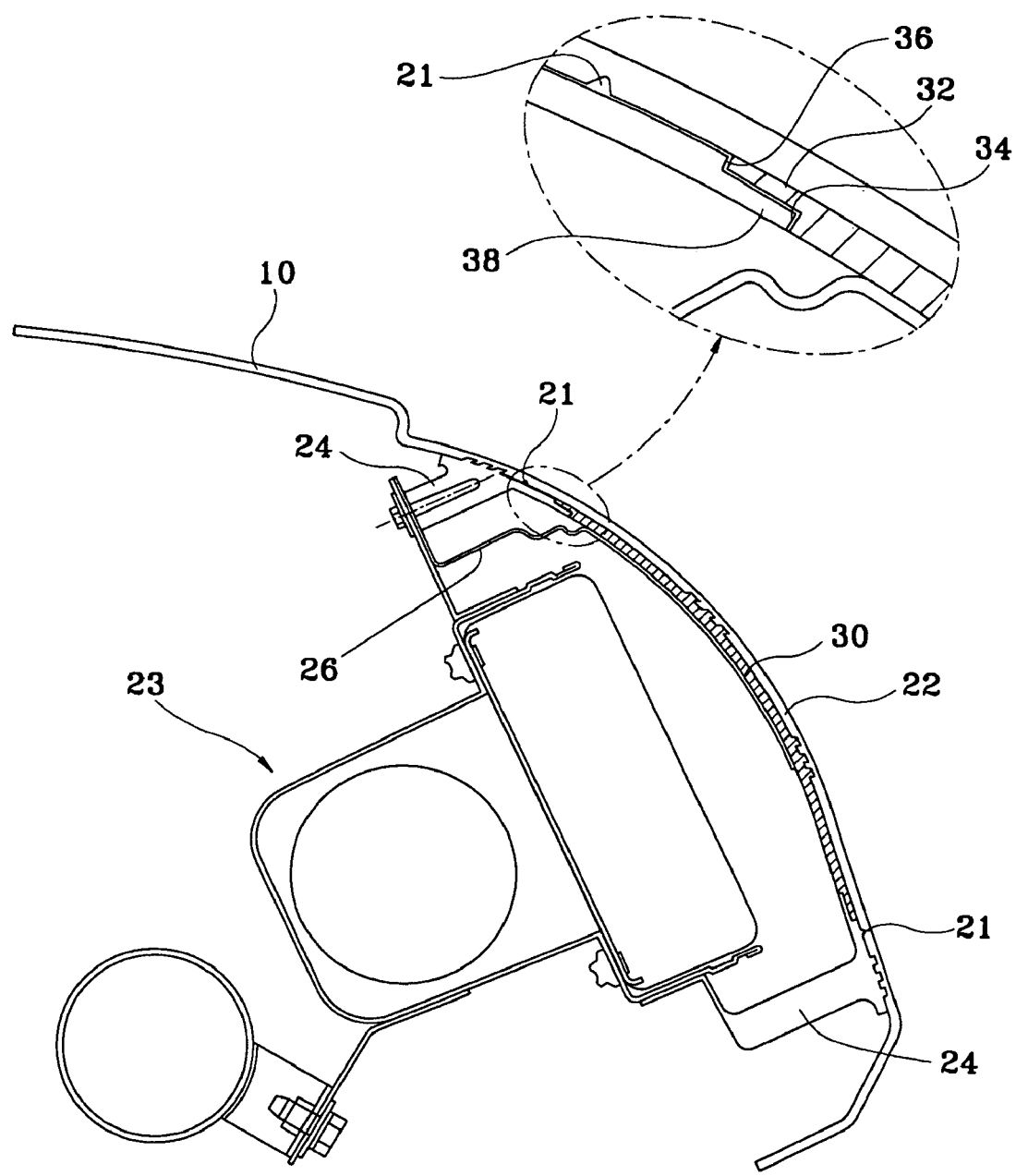
FIG. 2 is a cross-sectional view of the air-bag door structure taken along line II-II of FIG. 1.

According to FIGS. 1 and 2, a door part 22 is formed by being surrounded by a tear seam 21 formed inside an instrument panel 10. In other words, the tear seam 21 is broken upon expansion of the air-bag and the door part or cover 22 is separated from an instrument panel 10 so as to form a passage for deployment of the air-bag.

A chute 24 is furnished inside the instrument panel 10 to mount the air-bag module 23 while it is secured at the instrument panel 10 so that the condition of being in contact with the instrument panel 10 surface may be provided in the portion where the tear seam 21 is formed. In other words, while the chute 24 forms one body inside the instrument panel 10 by, for example, fusion attachment and other techniques, one body is not formed in the portion where the tear seam 21 of the instrument panel 10 is formed. However, the condition is allowed such that the surface of the instrument panel 10 and the surface of an chute 24 are in contact with each other.

While a reinforcement member 30 is combined inside the door part 22, there exists a structure combined with the chute 24 in a step form at the circumference portion of the reinforcement member 30. In other words, in the circumference portion of the reinforcement member 30, the side that is in contact with the instrument panel 10 protrudes toward the chute 24 to form a reinforcement member protrusion end 32 and a reinforcement member depression part 34. In the chute 24, a chute depression part 36 into which the reinforcement member protrusion end 32 is inserted and a chute protrusion end 38 that protrudes toward the reinforcement member depression part 34 are formed so that the reinforcement member 30 and the chute 24 may be combined with each other in a step form.

Consequently, while the reinforcement member 30 is supported by the chute 24 along its circumference in regard to the pressure exerted from outside of the instrument panel 10, it is not supported by the chute 24 in regard to the pressure exerted from inside of the instrument panel 10. Therefore, if the air-bag operates and pressure is exerted onto the reinforcement member 30 from inside the instrument panel 10, the circumference portion of the reinforcement member 30 is not supported by the chute 24, but the delivered pressure is delivered to the instrument panel 10 as is. As a result, the door part 22 is separated from the instrument panel 10 by the tear seam 21 being broken, so a passage is formed for deployment of the air-bag.

On the other hand, if pressure is exerted on the door part 22 by a passenger, an object, or the like from a passenger room under, the circumference part of the reinforcement member 30 is supported by the chute 24 and deformation of the door part 22 is minimized. In addition, the portion of the instrument panel 10 where the tear seam 21 is formed is supported by the chute 24 so pressure concentration does not take place in the tear seam 21 and the tear seam 21 is prevented from being broken.

Combination of the reinforcement member 30 and the door part 22 is carried out by vibrating fusion attachment if both the reinforcement member 30 and the door part 22 are made of plastic materials, while it is carried out by heat staking if the reinforcement member 30 is of plastic and the door part 22 is made of metallic material. Thus, the reason for combining the reinforcement member 30 and the door part 22 at their surfaces is not to allow any gap between the reinforcement member 30 and the door part 22 because the tear seam 21 may be prone to destruction even by a small shock.

The vibrating fusion attachment is a means to combine two plastic plates at their surfaces by heat generated from vibration while two plastic plates are in contact with each other. The heat staking is a means to combine a plastic plate with a metal plate at their surfaces by applying heat while they are being pressed together.

Figure 3:
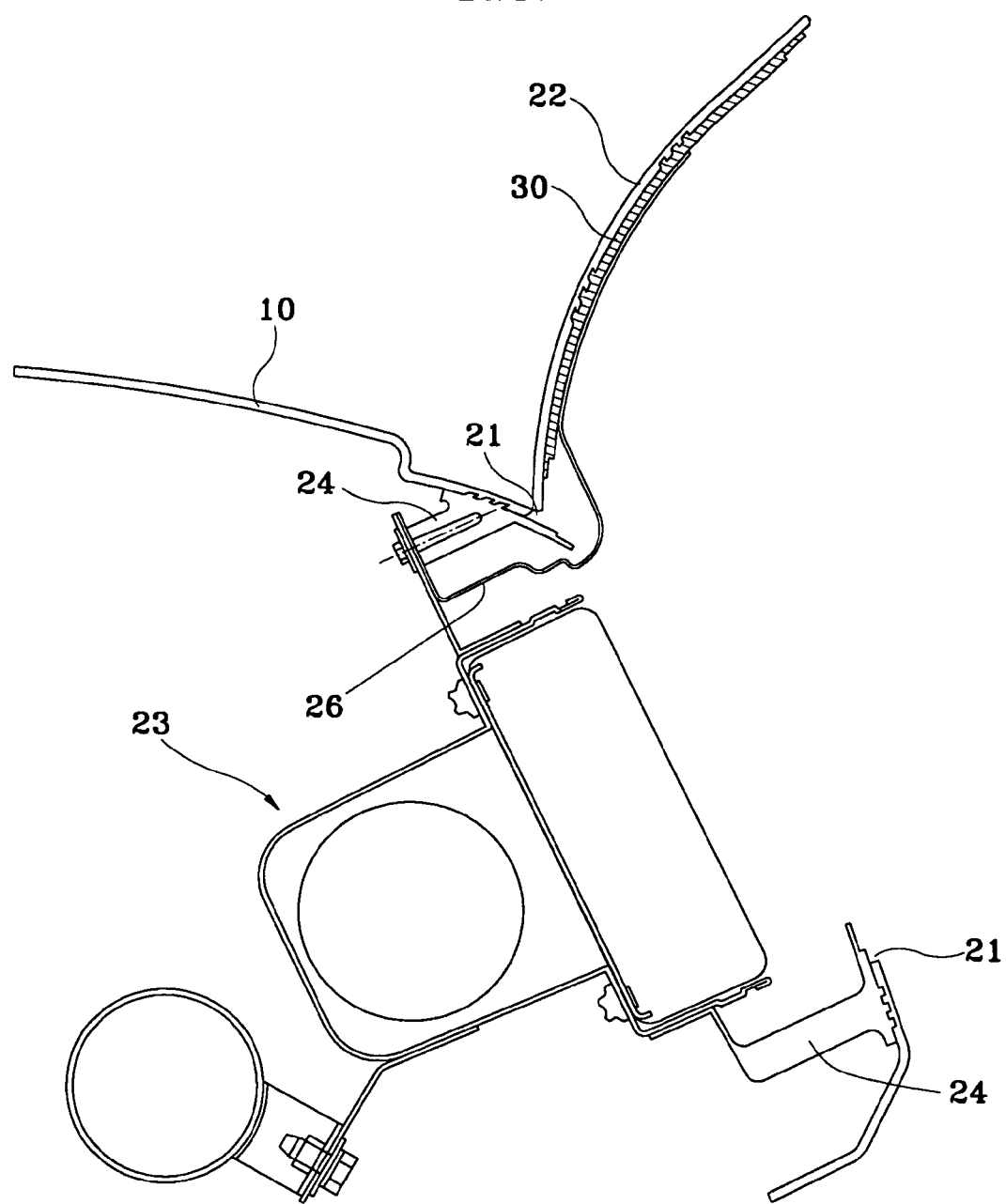
FIG. 3 is a cross-sectional view showing movement of the air-bag door upon deployment of the air-bag shown in FIG. 2.

Additionally, the inner side of the reinforcement member 30 connects with the chute 24 by the door plate 26. Thus, the reason for connecting the inner side of the reinforcement member 30 with the chute 24 by the door plate 26 is to prevent the reinforcement member 30 and door part 22 from bouncing forward by the explosive force during air-bag operation and injuring the body of a passenger. The reinforcement member 30 and the door part 22 are combined with at their surfaces to become open while rotating towards the top, as shown in FIG. 3.

As the circumference portion of the reinforcement member 30 is supported by a chute 24 in one-direction, it may not possibly move in the inward direction, but may move in the outward direction. Therefore, if a passenger exerts shock or a force to the door part 22 from within the passenger compartment, the door part 22 is supported by the reinforcement part 30 installed on the back of the door part 22 so the tear seam 21 is not broken. Therefore, if the tear seam 21 is broken not by the existing air-bag operation but by a passenger, the passenger can become injured by sharp edges formed around the door part 22. On the other hand, as the reinforcement member 30 may move in the outward direction upon expansion of an air-bag, the tear seam 21 is broken moving to an outward direction and does not interfere with expansion of the air-bag so that reliability of air-bag operation may be secured.

Additionally, as the reinforcement member 30 connects with the chute 24 by the door plate 26, the reinforcement member 30 and door part 22 are prevented from being completely separated and hitting the face of a passenger.

According to the present invention, an air-bag structure is provided wherein a tear seam forms an air-bag door. The tear seam is not broken by force or shock applied to the door from a passenger room, but the tear seam is easily broken upon expansion of the air-bag to secure smooth and reliable air-bag operation and provides a sturdy air-bag structure against the shock from a passenger room.

What is claimed is:

1. An air-bag door structure, comprising:
a door part in an instrument panel, wherein said door part includes a tear seam formed inside the instrument panel;
a chute secured at the instrument panel so that the chute is in contact with the instrument panel at a portion where the tear seam is formed; and
a reinforcement member combined with an inner side of the door part, wherein a circumference portion of the reinforcement member is combined with the chute in a step form;
wherein in the circumference portion of the reinforcement member, a side in contact with the instrument panel protrudes toward the chute to form a reinforcement member protrusion end and a reinforcement member depression part; and,
in the chute, a chute depression part into which the reinforcement member protrusion end is inserted and a chute protrusion end that protrudes toward the reinforcement member depression part are formed.

2. An air-bag door structure, comprising:
a door part in an instrument panel, wherein said door part includes a tear seam formed inside the instrument panel;
a chute secured at the instrument panel so that the chute is in contact with the instrument panel at a portion where the tear seam is formed; and
a reinforcement member combined with an inner side of the door part, wherein a circumference portion of the reinforcement member is combined with the chute in a step form, and wherein an inner side of the reinforcement member is combined with the chute by a door plate.

* * * * *